June 8, 1965 M. B. ELLS ETAL 3,188,111
OVERHEAD GUARD FOR FORK-LIFT TRUCKS
Filed April 19, 1962 3 Sheets-Sheet 1
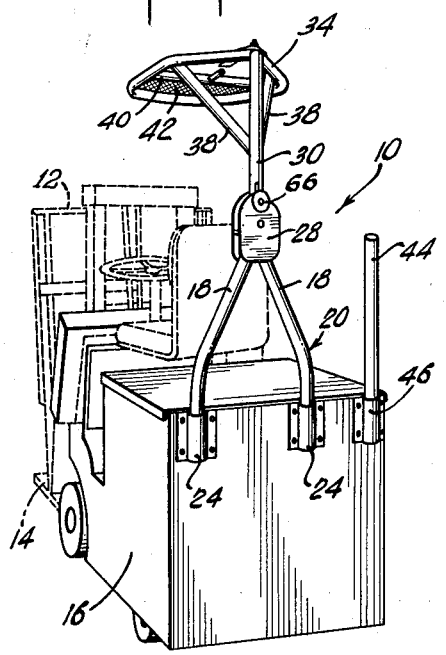
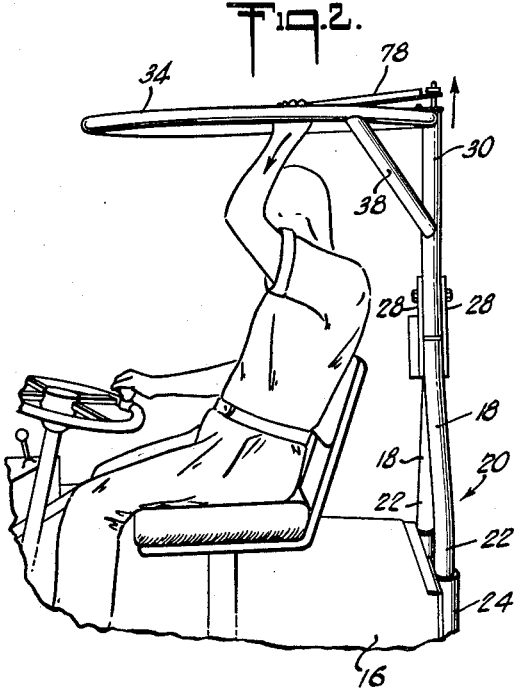
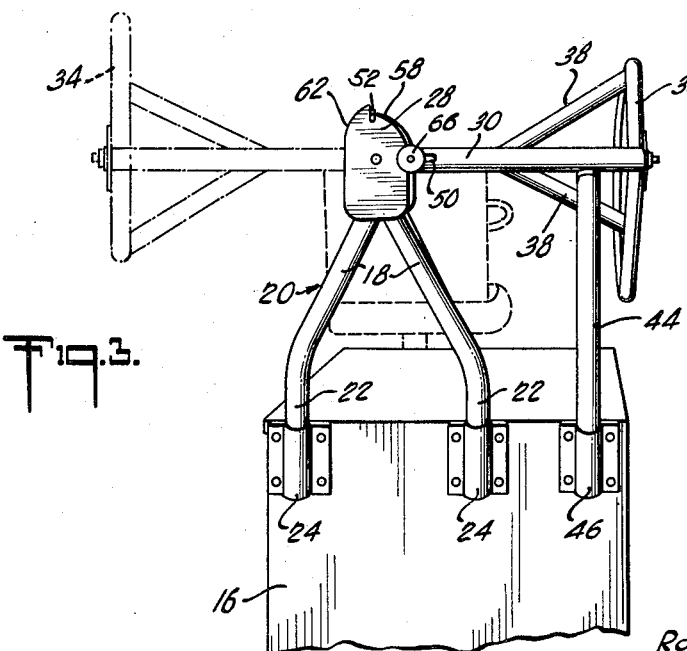
INVENTORS
MYRON B. ELLS
ROBERT CAEMMERER
BY
ATTORNEY

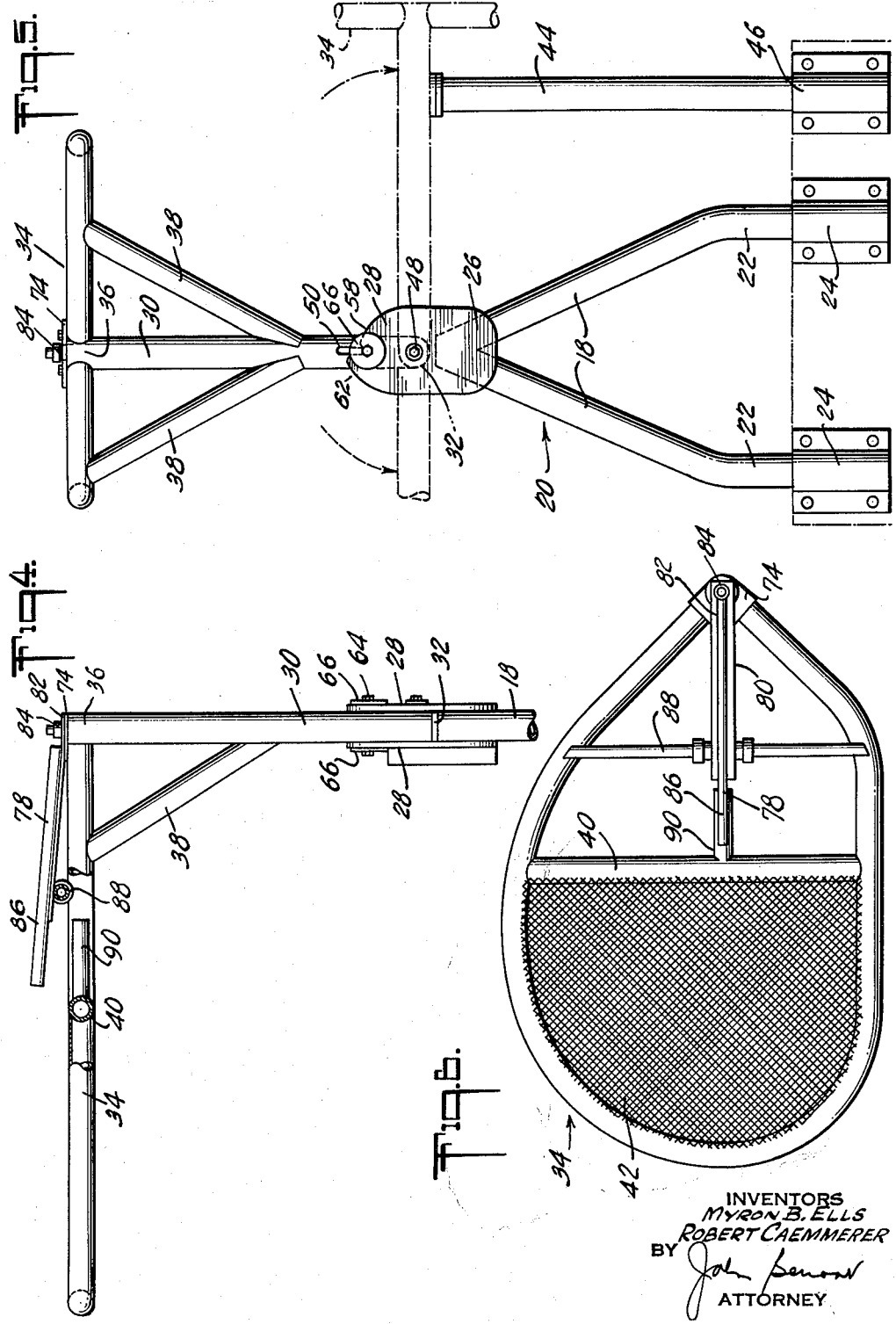

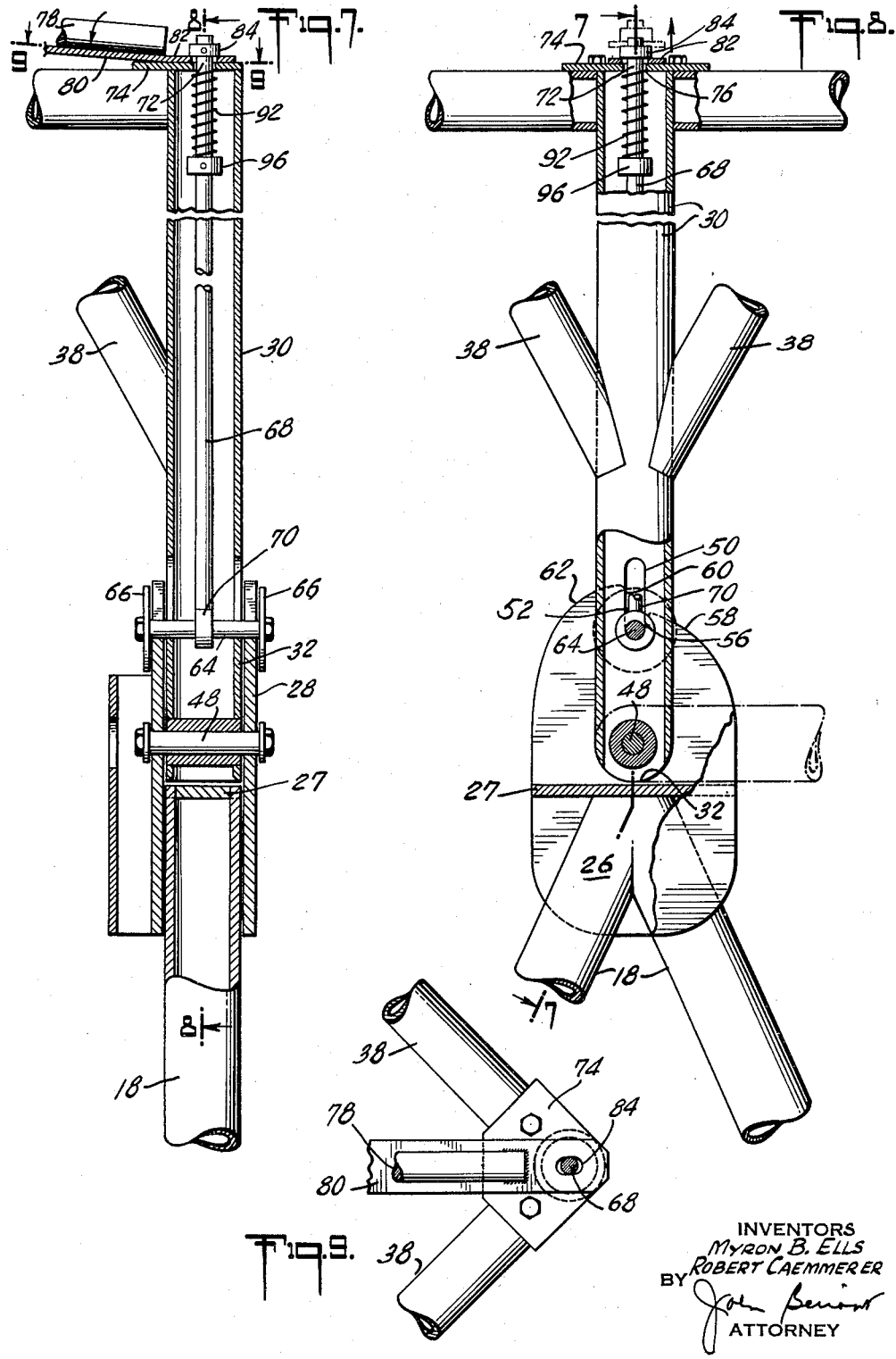

United States Patent Office 3,188,111
Patented June 8, 1965

3,188,111
OVERHEAD GUARD FOR FORK-LIFT TRUCKS
Myron B. Ellis, Somerville, and Robert Caemmerer, Westfield, N.J., assignors, by mesne assignments, to Johnson & Johnson, New Brunswick, N.J., a corporation of New Jersey
Filed Apr. 19, 1962, Ser. No. 188,680
14 Claims. (Cl. 280—150)

This invention relates to fork-lift trucks and similar vehicles and more particularly to guards for protecting the operators of such vehicles.

A fork-lift truck is one form of vehicle commonly used for transporting loads of material in factories and in similar establishments. It generally comprises a self-propelled, four-wheel vehicle having at its front end a vertical telescopically extensible mast structure which can be extended vertically upwardly to a height higher than the truck. The mast structure is also usually tiltable from the vertical. Horizontally extending fork frames or other load-supporting devices upon which loads may be supported and transported are mounted on the mast structure and are movable vertically therewith.

A fork-lift truck is especially designed to pick up and move loads of material placed on skids or pallets which have openings into which the fork frames mounted on the mast structure are inserted prior to lifting the skids or pallets from the surface on which they rest. Because the mast structure is extensible vertically, a load of material can be lifted to a height many times higher than the height of the truck so that the material may be stacked for a considerable height, or removed from the stack as desired.

These fork-lift trucks are used extensively in moving raw materials and finished products to and from manufacturing lines to warehouses, and from warehouses to trailer trucks and trains for transport to the market. Since they are operated indoors most of the time, the trucks must often pass through passages which are low in height and have limited clearance. This is particularly true of openings in trailer trucks. The minimum height of an opening through which the fork-lift truck can pass is usually determined by the height of the mast structure when it is in its full down position.

Since the fork-lift trucks are used to stack materials to a considerable height and to remove materials from such stacks, there is always present the danger of the stacked material falling down on the operator of the truck. It would be desirable, therefore, to provide the operator with an overhead protective device to avoid such danger. However, any such protective device must not limit the ability of the truck to maneuver and to pass through openings through which the truck can normally pass.

In accordance with this invention, there is provided an inexpensive overhead protective guard for the operator of a fork-lift truck and similar vehicles which protects the operator from falling objects and which may be moved from its overhead protecting position to a position lower than the height of the mast structure on the truck when the mast structure is in its down position. Another feature of the invention is the provision of an overhead protective guard for the operator which does not impair his vision and which can be moved and lowered by the operator from its overhead protecting position to a lower position, e.g., along the side of the operator, while the operator remains in his operating position on the truck. A still further feature of the invention is a protective guard of the foregoing type which, when moved from its overhead protecting position to a lower position, does not extend appreciably beyond the side of the fork-lift truck so that the clearance width of the truck is substantially the same. The guard may also be designed to provide ready access to the power plant of the truck and, if desired, to be removably secured to the truck. Other features of the invention will become apparent from a consideraion of the attached drawing and the following specification.

Referring to the drawings:

FIG. 1 is a perspective view of a fork-lift truck, taken from the left rear, provided with an overhead protecting guard incorporating the invention.

FIG. 2 is a side view of the truck operator station of the truck with an operator seated at the station and illustrating the overhead protecting position of the overhead guard with respect to the operator and also illustrating the accessibility to the operator of devices for moving the guard downwardly from its overhead protecting position.

FIG. 3 is a rear view of the guard mounted on the rear of the truck illustrating, in solid lines, its position with respect to the right side of the truck when moved downwardly to the right of the operator station to a rest position on a guard support and, in dotted lines, its position with respect to the left side of the truck when moved downwardly to the left of the operator station.

FIG. 4 is an enlarged, side elevational view of the top portion of the overhead guard.

FIG. 5 is a fragmentary rear view of the guard illustrating its upright position in solid lines and, in dotted lines, its movability to a downward position to the right and left thereof.

FIG. 6 is a top plan view of FIG. 4.

FIG. 7 is an enlarged vertical view, partly in section, illustrating the latch mechanism of the overhead guard.

FIG. 8 is a view of FIG. 7, partly in section, taken along lines 8—8.

FIG. 9 is a view of FIG. 7 taken along lines 9—9.

The invention comprises, in general, an overhead guard in the form of an inverted L-shaped structure which is rigidly and which may be removably secured to the rear of the truck behind the operator station and having a guard protecting portion which extends over the operator station from which it may be easily and readily moved downwardly from its overhead position by the operator to a lower position to permit entry of the truck through a low-overhead clearance opening, and then back up to its overhead protecting postion.

A vehicle, such as a fork-lift truck, for moving and stacking material, is represented generally in the drawings by numeral 10. The vehicle is self-propelled, and has at the front thereof vertically extending telescopic mast structure 12 which is tiltable from the vertical as illustrated and which has at the bottom horizontally extending support fork frames 14 upon which material may be supported and carried from one location to another. The fork frames are arranged to be moved vertically upwardly and downwardly on the mast structure to a considerable height, simultaneously moving the material supported on the fork frames.

The operator of the vehicle occupies a conventional vehicle driving position and has available all the controls necessary for operating the vehicle and the mast structure. In most instances, the operator's position is towards the rear of the truck, above or next to the power source of the vehicle which may consist of storage batteries stored within a housing 16.

An overhead protective guard incorporating the invention includes two pipes 18, 18 in the form of an A-frame 20 with the pipes extending straight up from the rear of the fork-lift truck for a short distance and then converging to meet. The bottom ends 22 of the legs of the A-frame are adapted to be removably inserted into sockets in mounting brackets 24 solidly fastened to the rear of the vehicle so that the entire assembly may be removed if desired. The converging top ends of the A-frame legs are welded together at their junction 26 and also to a horizontal metal plate 27 which extends slightly beyond the sides of the pipes. Spaced, parallel, vertically positioned generally oval shaped latch pin plates 28, 28 formed from heavy steel plate, are welded to the outside of the converging ends of the pipes 18 and to the horizontal plate 27 at approximately the transverse center line of the latch pin plates. An overhead guard support pipe 30 extends vertically upwardly from between the opening defined by the spaced latch pin plates, with its lower end 32 just clearing the metal plate 27 above the apex of the A-frame. The support pipe is pivotally secured to the latch pin plates so that it may be moved rotatably upwardly and downwardly around the pivot. The support pipe, which is rounded at its lower end 32, extends vertically upwardly to a height just above the height of the operator when he is seated in his operating position.

An overhead protective guard 34 for the operator in the form of pipe bent to a generally oblate configuration is welded at one end to the top end 36 of the overhead guard support pipe and extends horizontally therefrom towards the front of the vehicle in a position directly above the head of the operator. The overhead protective guard is further secured to the support pipe by pipes 38, 38 which extend from about the midpoint of the support pipe angularly upwardly to the guard and which are welded at their ends to both the support pipe and the overhead guard. The front end of the overhead guard extends just beyond the seat of the operator to provide the necessary overhead protection. A transverse brace 40 in the form of a pipe extends transversely across the width of the overhead guard and is welded thereto. A heavy wire screen 42 is welded to the overhead guard and covers the opening defined by the transverse brace and the front part of the guard.

The support pipe and the overhead protective guard secured thereto are pivotally movable around the lower end of the support pipe downwardly and to the side of the operator to permit the vehicle to be driven into openings having a low clearance. When the overhead guard member is in its protective position over the operator station, the support pipe is in a vertical position and the height of the overhead guard member is sufficient to clear to the head of the operator and may be higher than the height of the mast structure on the front of the truck when it is fully depressed. When the overhead guard member is moved from its overhead operator-protecting position to the right side of the operator station, the guard member does not extend appreciably beyond the right side of the vehicle, as seen from the rear, and desirably extends just to the side. The highest point on the guard is then no higher than the height of the mast structure when it is fully depressed and the truck therefore can enter an opening having an overhead clearance which will clear the top of the structure.

When the overhead guard member is moved downwardly to such right side position, it rests on the top of a rest 44 in the form of a vertically extending pipe secured to the right side of the vehicle in a mounting bracket 46 and extending upwardly to about the height of the latch pin plates. After the vehicle has passed through an opening having a low clearance, the overhead guard member is moved from its down position to the right of the operator and returned upwardly to its overhead protecting position. When the guard is used with fork-lift trucks of relatively narrow width, the A-frame is preferably positioned somewhat to the left of the longitudinal center line of the fork-lift truck, as seen in FIG. 3, in order to enable the guard to clear the top of the operator's head and also so that when the overhead guard member is moved downwardly to the right it will not extend beyond the side of the truck.

Movement of the overhead guard member downwardly to the side of the operator is obtained by pivotally associating the support pipe for the overhead guard member at its lower end to the latch pin plates just above the apex of the A-frame. The support pipe and the latch pin plates are provided with devices which can be actuated by the operator when positioned in his operator's position on the truck to secure the overhead guard in its upright position and to move it up and down.

The bottom end of the support pipe is pivotally associated with the latch pin plates at the apex of the A-frame by a pivot pin, such as a bolt 48, which extends through the pipe and both latch pin plates. Directly above the pivot pin, the support pipe is provided with two vertically extending and oppositely disposed slots 50. Each latch pin plate also has a vertical slot or groove 52 which extends downwardly from the top of the plates in alignment with the slots 50 in the lower end of the support pipe with the bottoms of the slots in the support pipe at the same level as the bottoms of the slots in each of the latch pin plates. The right side 56 of the slots in the latch pin plates, as viewed in FIG. 8, terminate in arcuate surfaces 58 which extend downwardly and to the right whereas the left side 60 of the slots in the latch pin plates, similarly viewed, terminate in similar arcuate surfaces 62 which extend downwardly and to the left, but at a position slightly higher than the arcuate surfaces 58 on the right sides.

A latch pin 64 in the form of a steel bolt extends through the slots in the support pipe and through and beyond each of the slots in the latch pin plates. A bushing or washer 66 is placed on each of the outwardly extending ends of the latch pin on the outer surface of each of the latch pin plates and is retained on the latch pin by means of a nut or similar fastener in proximity to the outer surface of the latch pin plates. The latch pin is free to move up and down in the slots in both the support pipe and in the latch pin plates.

A latch pin detaching rod 68 extends downwardly through the hollow interior of the support pipe and is secured at its bottom end 70 to the latch pin. The upper end 72 of the latch pin detaching rod extends beyond the upper end of the support pipe through an opening in a metal plate 74 bolted or otherwise secured to the top of the junction of the pipes forming the rear portion of the overhead guard member which is directly over the support pipe and which is welded to the pipe. The plate is provided with an oval shaped opening slightly larger than the diameter of the latch pin detaching rod so that the rod is freely movable up and down therein.

The latch pin detaching rod is connected to a horizontally extending lever 78 which is in the form of pipe having welded to its bottom surface a flat rectangular metal lever plate 80 slightly wider than the pipe and with its forward end terminating inwardly of the forward end of the pipe and with its rear end 82 extending beyond the rear end of the pipe. The rear end of the plate is bent at a slight angle inwardly with respect to the longitudinal axis of the pipe and is provided with an opening 84 through which the upper end of the latch pin detaching rod extends.

The rear end 82 of the lever plate is positioned above and rests on top of the metal plate 74 at the top of the support pipe with the upper end of the latch pin in detaching rod extending through and beyond the rear end of the lever plate and terminating in a threaded end which is provided with a nut or collar 84. The lever plate is thus connected to the latch pin detaching rod. The lever extends horizontally forwardly from the latch pin detaching rod towards the overhead guard member and on the top thereof with the end 86 of the lever positioned directly above the head of the operator of the vehicle when he is at the operator position. The lever rests on a pivot rod 88 in the form of a steel rod welded to the pipe forming the overhead guard member and extending across its width approximately midway between the ends of the lever. The pivot rod acts as a fulcrum around which the lever may be rotated and thus simultaneously raise and lower the latch pin detaching rod within the support pipe. A short hand-gripping member 90 in the form of a steel pipe is welded at its forward end to the transverse pivot rod 40 and extends rearwardly directly below the forward end 86 of the lever in alignment therewith. When the operator wishes to disengage the latch pin from the latch pin receiving slots in the latch pin plates, he grasps the end of the lever simultaneously with the hand-gripping member positioned below and by a squeezing action, depresses the forward end of the lever causing it to pivot around the transverse pivot rod, thereby raising the rear end of the lever which is connected to the latch pin detaching rod, thus raising the rod and simultaneously raising upwardly the latch pin from within the slots within the latch pin plates.

The latch pin detaching pin rod is provided with a return spring 92 at its upper end. The spring encircles the upper end of the rod directly below metal plate 74 through which the end of the latch pin detaching rod extends. The spring is maintained in position on the upper end of the rod in contact with the plate by a collar 96 secured to the rod directly below the lower end of the spring. As the latch pin detaching rod is moved up and down within the support pipe by manipulation of the lever, it works against the spring, causing it to compress in an upward movement of the rod and returning the rod downwardly by spring action when such compression is released.

When the latch pin has been raised sufficiently in the slots in the latch pin plates to clear the top of the arcuate surfaces 58 on the right side of the latch pin plates, the support pipe and the overhead guard member may be moved downwardly and to the right of the operator station with the bottom surface of the latch pin riding over the arcuate surface on the right side of the latch pin plates in a cam-like action until the support pipe rests on the top of the pipe rest 44 secured to the right side of the vehicle.

The overhead guard and the support pipe may be returned to the operator protecting position, i.e. directly over the operator's head, by lifting the pipe and guard from its rest position on the pipe rest and rotating them about the pivot pin until the overhead guard is directly over the operator position. In the last part of such movement, the latch pin again engages and rides over the arcuate surface on the right side of the latch pin plates until it reaches the latch pin receiving slots in the latch pin plates, whereupon, due to the return action of the return spring at the upper end of the latch pin detaching rod against collar 96, the latch pin is urged positively downwardly into the latch pin slots, thereby securing the support pipe and the overhead guard in the upright, guard protecting position.

If desired, the guard may be designed to permit it to be moved downwardly and to the left, as illustrated in dotted lines in FIG. 3 of the drawings to provide access to the battery storage compartment of the vehicle. This may be accomplished by depressing the lever 78, in the manner described above, to a greater extent than required when it is desired to move the support pipe and the overhead guard member downwardly and to the right. A greater depression of the lever increases the extent of the upward movement of the latch pin detaching rod and thus moves the latch pin upwardly beyond the arcuate surfaces on the right side of the latch pin plates up to the point where the latch pin reaches the arcuate surfaces on the left side of the plates which surfaces are at a position slightly higher than the arcuate surfaces on the right side of the plates. When the latch pin has reached the top of the arcuate surfaces on the left side of the plates, the support pipe and overhead guard may be moved downwardly and to the left, as viewed from the rear of the vehicle (see FIG. 3, dotted lines) to provide access from above to the battery storage compartment.

As noted in FIG. 3, where the A-frame is positioned to the left side of the rear of the fork-lift truck, the support pipe and the overhead guard member may extend beyond the left side of the truck, particularly if the truck is of the narrow width type.

The arcuate surfaces on the left side of the latch pin plates are preferably at a height greater than the arcuate surfaces on the right side of the plates so that the support pipe and the overhead guard member will first be movable downwardly to the right when the latch pin is moved upwardly in the latch pin receiving slots in the plates since the support pipe and overhead guard member will be moved most frequently to this position. However, the left and right cam surfaces on the latch pin plates may, if desired, be of the same height, or otherwise arranged.

As described in the foregoing illustrative embodiment of the invention, there is provided an overhead protecting guard for the operator of such vehicles as fork-lift trucks which is simple and economical to manufacture, readily and easily installed, and simple and easy to operate by the operator of the vehicle without moving from his operator position while unaffecting his vision or operability of the vehicle. It is apparent that numerous modifications, variations and changes may be made without departing from the spirit of the invention.

Having thus described our invention, we claim:

1. For use with a fork-lift truck and like vehicles having an exposed operator station, a protective guard for the operator of said vehicle comprising a support adapted to be rigidly secured to said vehicle in an upright position rearwardly of said operator station, an overhead guard member pivotally associated with said support and extending forwardly therefrom over said operator station and being unsecured at its forward end, means for maintaining said overhead guard member in said forwardly extending position, and means for moving said overhead guard member from said forwardly extending position over said operator station to a lower position.

2. A guard in accordance with claim 1 wherein said means for moving said overhead guard member to said lower position are accessible to and operable by said operator when at said operator station.

3. A guard in accordance with claim 1 wherein said overhead guard member is movable downwardly from over said operator station to a lower position to the left and right of said operator station.

4. For use with a fork-lift truck and like vehicles having an exposed operator station, a protective guard for the operator of said vehicle comprising a frame adapted to be rigidly secured to said vehicle in an upright position rearwardly of said operator station, a support member pivotally associated with said frame and adapted to be secured in an upright position, an overhead guard member supported by said support member and extending forwardly therefrom over said operator station, and being unsecured at its forward end, means for detachably securing said overhead guard member in said forwardly extending position, and means associated with said detachably securing means for pivotally moving said support member and said overhead guard member to a lower position to a side of said operator station.

5. For use with a fork-lift truck and like vehicles having an exposed operator station, a protective guard for the operator of said vehicle comprising a frame adapted to be rigidly secured to said vehicle in an upright position rearwardly of said operator station, latch means at the top of said frame, a support member pivotally associated with said frame at said latch means and adapted to be secured in an upright position, an overhead guard member supported by said support member and extending forwardly therefrom over said operator station and being unsecured at its forward end, means associated with said latch means for detaching said support member from said upright position and moving said support member and said overhead guard member to a lower position to a side of said operator station.

6. For use with a fork-lift truck and like vehicles having an exposed operator station, a protective guard for the operator of said vehicle comprising a frame adapted to be rigidly secured to said vehicle in an upright position rearwardly of said operator station, spaced latch plates secured to said frame at the top thereof, an upwardly extending support member having its lower end positioned between said latch plates and being pivotally associated therewith, said latch plates each having aligned slots opening at the top of said plates, slots in said support members alignable with said slots in said latch plates, a latch pin extending through said slots in said support member and adapted to be removably positioned in said slots in said latch plates, a latch pin detaching rod attached to said latch pin and extending beyond the end of said support member opposite said pivotally associated end, an overhead guard member supported by said support member and extending forwardly therefrom over said operator station, devices on said overhead guard member accessible to the operator of said vehicle when at said operator station and connected with said latch pin detaching rod for moving said rod upwardly and, simultaneously therewith, moving said latch pin from within said latch plate slots, whereby said overhead guard member and said support member may be moved downwardly to a lower position.

7. A guard in accordance with claim 6 wherein said support member is hollow and said latch pin detaching rod extends through said member.

8. A guard in accordance with claim 6 wherein said latch plates are provided with cam surfaces on which said latch pin rides as said support member and said overhead guard member are moved upwardly and downwardly.

9. A guard in accordance with claim 6 wherein said latch plates are provided with cam surfaces on each side of said slots, one of said cam surfaces being higher than the other.

10. A guard in accordance with claim 6 in combination with a rest upon which said support member and said overhead guard member rest in the down position.

11. For use with a fork-lift truck and like vehicles having an exposed operator station, a protective guard for the operator of said vehicle comprising a support adapted to be rigidly secured to said vehicle in an upright position rearwardly of said operator station, an overhead guard member pivotally associated with said support and extending forwardly therefrom over said operator station and being unsecured at its front end, means for maintaining said overhead guard member in said forwardly-extending position, and means accessible to and operable by said operator when at said operator station for moving said overhead guard member from said forwardly-extending position over said operator station to a lower position to the side thereof not extending substantially beyond the side of said vehicle.

12. For use with a fork-lift truck and like vehicles having an exposed operator station, a protective guard for the operator of said vehicle comprising a support adapted to be rigidly secured to said vehicle in an upright position, an overhead guard member pivotally associated with said support and extending over said operator station and being unsecured at its forward end, means for maintaining said overhead guard member in said position over said operator station, and means accessible to and operable by said operator when at said operator station for moving said overhead guard member from over said operator station to a lower position to the side thereof.

13. In combination with a fork-lift truck and like vehicles having an exposed operator station, a protective guard for the operator of said vehicle comprising a support rigidly secured to said vehicle in an upright position rearwardly of said operator station, an overhead guard member pivotally associated with said support and extending forwardly therefrom over said operator station and being unsecured at its forward end, means for maintaining said overhead guard member in said forwardly-extending position, and means accessible to and operable by said operator when at said operator station for moving said guard member from said forwardly-extending position over said operator station to a lower position to the side thereof.

14. The combination in accordance with claim 13 wherein said overhead guard member when in said lower position does not extend substantially beyond the side of said vehicle.

References Cited by the Examiner
UNITED STATES PATENTS

| 2,263,981 | 11/41 | Dalecke et al. | 214—672 |
| 2,444,387 | 6/48 | Vesta | 296—102 X |
| 2,565,919 | 8/51 | Hill | 296—102 X |
| 2,806,618 | 9/57 | Cook | 214—672 |
| 2,810,489 | 10/57 | Davies | 214—672 |
| 2,943,885 | 7/60 | Fritzmeier | 296—102 |

A. HARRY LEVY, *Primary Examiner.*

LEO FRIAGLIA, *Examiner.*